Feb. 16, 1954   W. P. OEHLER   2,669,174
AGRICULTURAL IMPLEMENT
Filed Feb. 9, 1948   4 Sheets-Sheet 1

INVENTOR.
WILLIAM P. OEHLER
BY
ATTORNEYS

Feb. 16, 1954    W. P. OEHLER    2,669,174
AGRICULTURAL IMPLEMENT
Filed Feb. 9, 1948    4 Sheets-Sheet 2
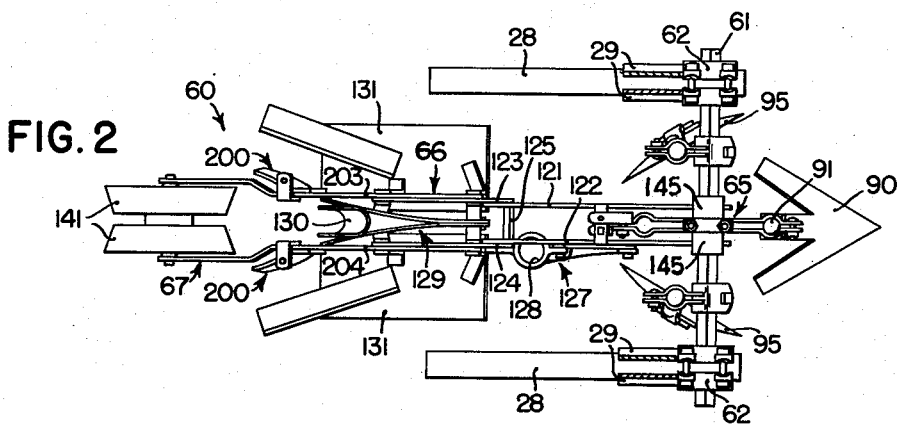
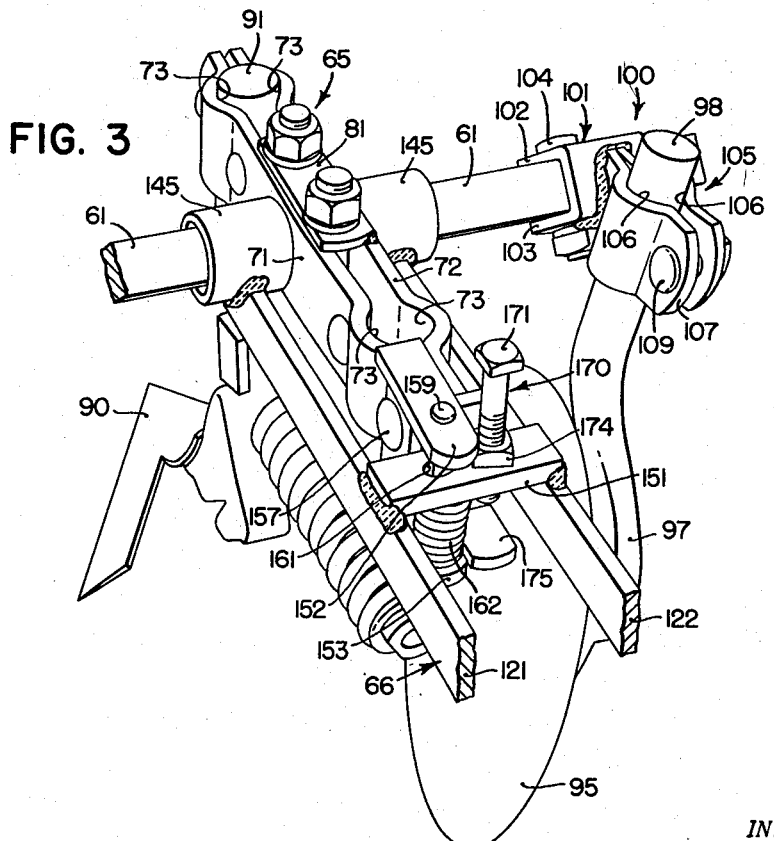
INVENTOR.
WILLIAM P. OEHLER
ATTORNEYS Feb. 16, 1954 W. P. OEHLER 2,669,174
AGRICULTURAL IMPLEMENT
Filed Feb. 9, 1948 4 Sheets-Sheet 3

INVENTOR.
WILLIAM P. OEHLER
BY
ATTORNEYS

*INVENTOR.*
WILLIAM P. OEHLER
BY
*ATTORNEYS*

Patented Feb. 16, 1954

2,669,174

UNITED STATES PATENT OFFICE 2,669,174

AGRICULTURAL IMPLEMENT

William P. Oehler, Moline, Ill., assignor to Deere & Company, Moline, Ill., a corporation of Illinois Application February 9, 1948, Serial No. 7,042

1 Claim. (Cl. 97—237)

The present invention relates generally to agricultural implements and more particularly to planting tools, especially tools of the type that are adapted to be mounted upon a propelling tractor.

The object and general nature of the present invention is the provision of a new and improved planting and fertilizer attachment especially adapted to be supported on the rig beams of a tractor mounted cultivator, so constructed and arranged that the planting and fertilizer attachment may be easily and quickly attached or mounted. Further, it is a feature of this invention to provide a new and improved planting and fertilizer attachment that may be easily and quickly arranged for operating under different soil conditions. For example, this attachment may be arranged for planting in newly opened furrows, or the attachment may be arranged to make beds and plant on the same, as desired, with new and improved means for applying either upwardly directed or downwardly directed pressure against the furrow openers, as necessary.

These and other objects and advantages of the present invention will be apparent to those skilled in the art after a consideration of the following detailed description, taken in conjunction with the accompanying drawings, in which:

Figure 2 is an enlarged plan view of the planting and fertilizer attachment shown in Figure 1;

Figure 3 is an enlarged fragmentary perspective view showing the new and improved front tool clamping support and associated parts;

Figure 1:
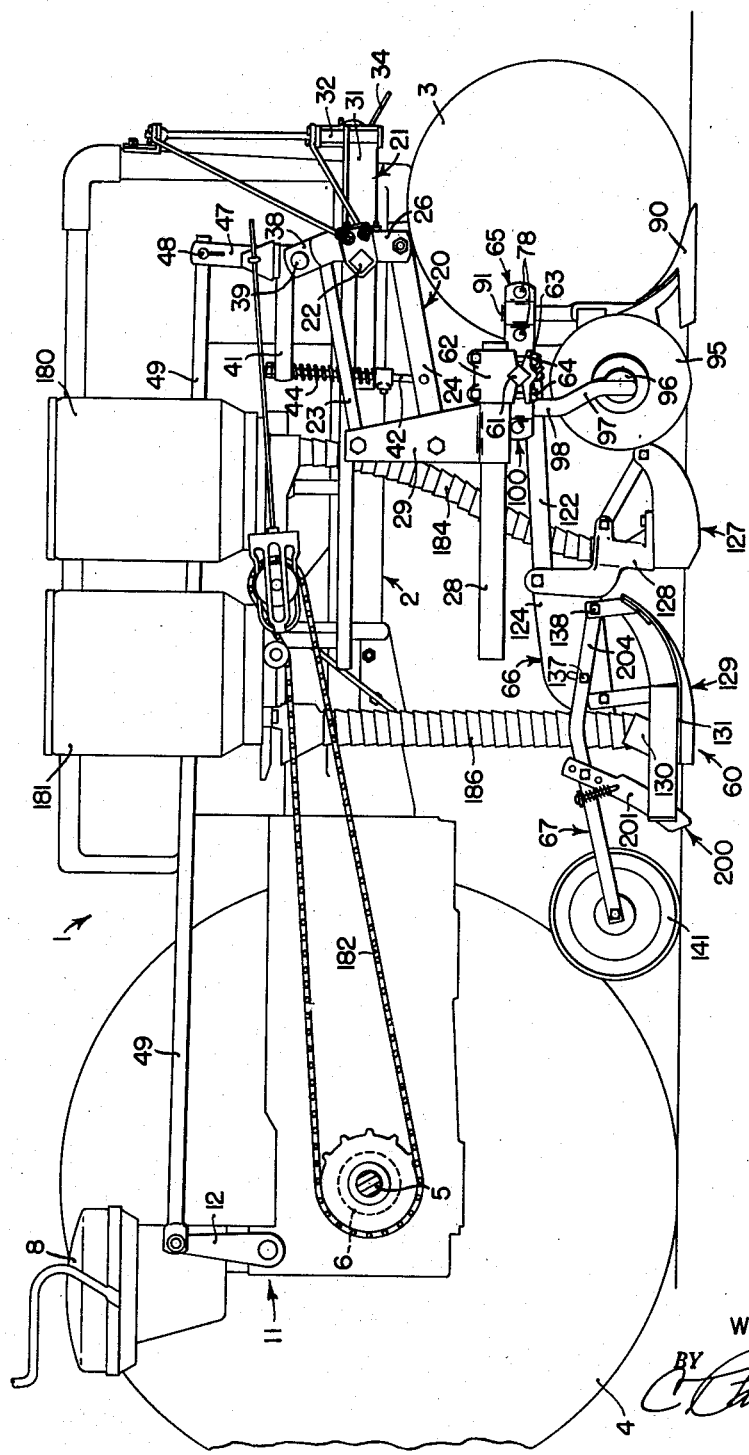
Figure 1 is a side view showing the planting and fertilizer attachment of the present invention mounted on a farm tractor of well known construction.
Figure 4:
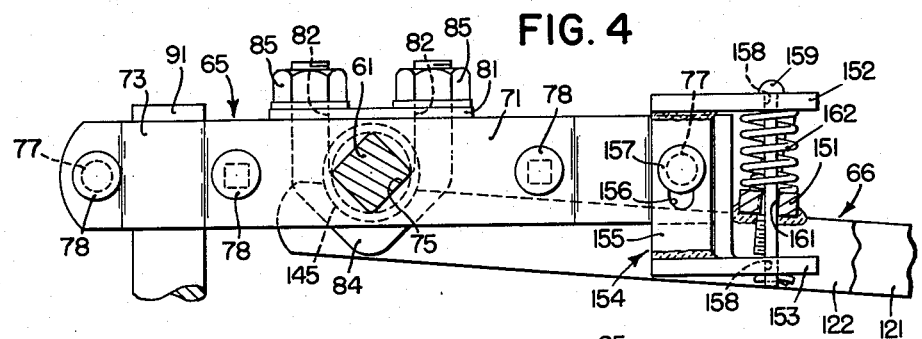
Figures 4 and 5 are detailed side views of the front tool clamping unit.
Figure 5:
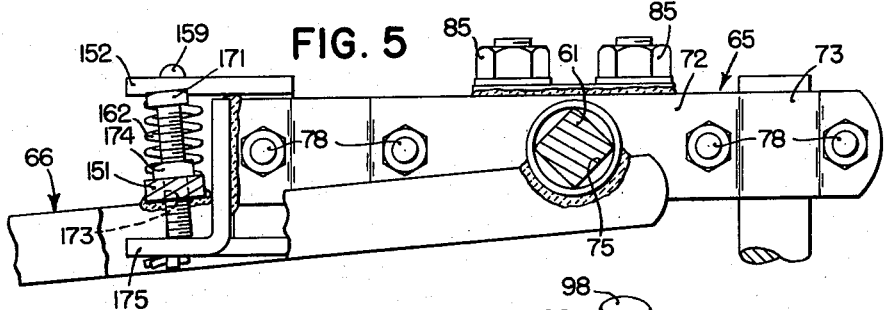

Referring now to the drawings, particularly Figure 1, the tractor on which the new and improved planting and fertilizer attachments are mounted is indicated in its entirety by the reference numeral 1 and is of the well known three wheel or tricycle type, including a narrow body 2, front wheel means 3 and laterally spaced rear or traction wheels 4 fixed to axles 5 that are journaled for rotation in rear axle extensions 6. However, as will be set forth below, the planting and fertilizer attachments of the present invention are also applicable to four wheel tractors, such as the one-row type, and the planting and fertilizer attachment of the present invention may readily be mounted underneath the tractor body of such tractors. The tractor 1 is provided with a seat 8 that defines the operator's station at the rear of the tractor, and the latter also includes a power lift unit 11 connected with the tractor motor so as to be driven therefrom and arranged to act through power lift arms 12 or the like for raising and lowering implement parts, which is conventional practice so far as the present invention is concerned.

According to the principles of the present invention, my new and improved planting and fertilizer attachment is constructed and arranged to be mounted on the rig beams of an integral or tractor mounted cultivator, especially one of the type shown in the United States Patent No. 2,423,148, issued to Theodore W. Johnson, July 1, 1947, although it is to be understood that the planting and fertilizer attachment of the present invention may readily be mounted on the rig beams of other types of tractor mounted cultivators or on other supports, as desired.

Referring particularly to Figure 1, the tractor mounted cultivator on which I have chosen to show my new and improved planting and fertilizer attachment is indicated in its entirety by the reference numeral 20 and includes an attaching frame 21 to each side of which a laterally outwardly extending draft bar 22 is connected, two pairs of vertically spaced links 23 and 24 at each side of the tractor and connected to the draft bar 22 by brackets 26, and a pair of rig beams 28 at each side of the tractor, each having a generally upwardly extending bracket 29 to which the rear ends of the associated links 23 and 24 are pivotally connected. The attaching frame 21 comprises a pair of side bars 31, each formed at its forward end with a vertical sleeve or bushing 32, and a central member (not shown)

pivotally connected to the side members 31 through the bushings 32. The central member is received on the tractor by a tractor-carried socket member 34. Each of the brackets 26 includes an apertured bracket extension 38 in which a transverse rockshaft 39 is mounted. The rockshaft 39 carries a pair of lift arms 41 and each lifting arm 41 is connected with the lower link 24 of the associated cultivator rig by means of a lifting rod 42 pivotally connected at its lower end with the associated link 24 and connected at its upper end by a trunnion or the like with the rear end of the associated lifting arm 41. A compression spring 44 is disposed between the trunnion and a set screw collar fixed adjustably to the associated lifting rod 42. For rocking each rockshaft 39, there being a rockshaft at each side of the tractor, I provide an arm 47 which is pivotally connected by a quick detachable pin 48 to a lifting pipe 49, the rear end of which is pivotally connected with the associated power lift arm 12. For further details of the cultivator structure reference may be had to the above mentioned U. S. Patent 2,423,148.

The planting and fertilizer unit is indicated in its entirety by the reference numeral 60, there being one of such units at each side of the tractor and each unit is supported on a cross bar 61 that is fixed to the two rig beams 28 at each side of the tractor. To this end, the forward end of each of the rig beams 28 carries a clamping member 62, and preferably the latter member is disposed immediately ahead of the associated rig beam bracket 29. Each clamping member 62 is provided with a clamping cap section 63 and clamping bolts 64 receiving the associated end of the supporting bar 61 for the planting and fertilizer unit 60. Essentially, each of the planting and fertilizer attachments 60 comprises a forward tool clamp unit 65 carried by the supporting bar 61 and a furrow opener frame unit 66 swingably connected with the bar 61 and usually, but not necessarily, provided with a press wheel unit 67 fixed adjustably to the rear end of the furrow opener frame unit 66, although if desired the press wheel unit 67 may be floatingly connected.

Each tool clamp unit 65 is made up of a pair of clamping members 71 and 72, which preferably are identical bars shaped to have a pair of arcuate half-sockets 73 disposed on opposite sides of a square opening 75 formed generally in the central portions of each of the bars 71 and 72 to receive the supporting bar 61. Bolt-receiving openings 77 are formed in the end portions of the bars 71 and 72 on opposite sides of the half-socket sections 73, these openings receiving clamping bolts 78 which when tightened secure the shanks of associated tools in the shank socket or sockets formed by the half-socket sections 73. One of the two clamp bars, such as the bar 72, has a plate 81 welded thereto, the plate being provided with a pair of openings 82 arranged on opposite sides of the supporting bar receiving openings 75. A clamping U-bolt 84 is adapted to embrace the supporting bar 61 on the lower side thereof and to have its threaded ends to extend upwardly through the openings 82 to receive nuts 85 which, when tightened, serve to clamp the unit 65 in place, it being understood that the bar 71 is firmly clamped to the bracket supporting bar 72 by the clamping bolts 78. The plate 81 is so constructed that when the bars 71 and 72 are fastened together by the clamping bolts 78, the outer edge of the plate 81 overlies and bears against the upper edge of the central section of the other tool clamp bar 71. When the planting and fertilizer attachment 60 is arranged as shown in Figures 1, 2 and 3, a front shovel 90 is disposed at the forward end of the tool clamp 65 and has its shank 91 disposed in the forward shank-receiving socket 73, 73 of the unit 65, the shank being firmly held in position by the forward clamping bolts 78. This disposes the shank 91 forward of the supporting bar 61. Also, in this arrangement a pair of hilling disks 95 are disposed rearwardly of the supporting bar 61, each hilling disk being set to turn the soil inwardly to form a hill, as best shown in Figure 2. Each hilling disk 95 is journaled for rotation on suitable bearing means 96 fastened at the lower or rearwardly offset end portion 97 of a hilling disk shank member 98, the upper end of which is disposed rearwardly of the associated supporting bar 61 and firmly secured thereto by a tool clamp unit indicated in its entirety by the reference numeral 100. In other tool arrangements it may be desired to dispose the hilling disks 95 so as to form a furrow, in which case it is desirable to interchange the two disks 95 and set them in a forwardly converging position forward of the supporting bar 61, and to the end that these disks may readily and quickly be interchanged and/or reversed, the tool clamp unit 100 is of special construction.

As best shown in Figure 3, each of the tool clamp units 100 comprises a U-shaped section 101 provided to receive the supporting bar 61, which preferably is square in section and set in a diagonal position. The U-shaped section 101 is provided with downwardly and outwardly extending end portions 102 and 103 which are generally parallel and spaced apart a distance such as to snugly receive the supporting bar 61 and apertured to receive a clamping bolt 104. The rear section 105 of the clamping unit 100 comprises a pair of vertically disposed strap sections welded at their inner ends to the U-shaped section 101 and shaped to provide a pair of half-sockets 106, the outer end portions 107 of the strap sections being shaped to closely approach one another and apertured to receive a clamping bolt 109 which, when tightened, firmly clamps the shank of an associated tool in the socket formed by the half-socket sections 106. When the tools are arranged as shown in Figures 1 and 2, the shank-receiving socket 106, 106 receives the shank 98 and is disposed rearwardly of the supporting bar 61, the U-shaped portion 101 being extended forwardly and downwardly and engaged over the supporting bar 61.

The furrow opener frame unit 66 comprises a pair of laterally spaced strap members 121 and 122 that are fixed at their rear ends, as by welding, to a pair of laterally spaced plate sections 123 and 124, the forward edges of the plate sections being rigidly interconnected by a cross plate 125 (Fig. 2). The plate sections 123 and 124 are provided with various apertures so as to accommodate the attachment of various tools thereto, such as a forwardly disposed fertilizer opener unit 127 having a fertilizer spout 128 and a rearwardly disposed seed furrow opener unit 129 having a seed receiving spout section 130. The unit 129 may also carry gauge shoes 131, if desired, and as mentioned above, a press wheel unit 67 is also adapted to be attached to the furrow opener frame unit 66 through the attaching bracket plate sections 123 and 124. The press wheel unit 67 comprises a pair of laterally spaced bars 203 and 204 apertured at their forward ends to receive clamping bolts 137 and 138 and spaced apart at their rear ends to receive a pair of press wheels 141. The press wheel unit 67 also includes knife covering members to which detailed reference will be made below.

In the arrangement of the tools, as shown in Figures 1 and 2, the front shovel 90 and the hilling disks 95 are carried rigidly by the supporting bar 61 on the cultivator rig beams 28, and hence are raised and lowered bodily by the raising mechanism of the tractor which is connected to raise the rig beams 28, such mechanism including the power lift arms 12, the lifting pipe members 49, the lifting arms 41 and 47 and the lifting rods 42. However, the furrow opener unit 66 is adapted to have limited swinging movement relative to the front tools 90 and 95 and the supporting bar 61, and to this end the forward end of each of the furrow opener frame bars 121 and 122 is provided with a short sleeve section 145, each of which is dimensioned to snugly but rockably fit over the associated supporting bar 61. The rocking movement or swinging movement of the furrow opener unit 66 relative to the supporting bar 61 and associated parts is limited by suitable abutment means and adjusting mechanism which will now be described. The forward portions of the frame bars 121 and 122 are rigidly interconnected by a cross strap or abutment member 151 which passes between upper and lower abutment sections 152 and 153 of an adjustable abutment member 154 that is mounted on the rear end of the tool clamp strap member 71. To this end, the abutment sections 152 and 153 are interconnected by a vertical bar 155 that is slotted, as at 156, to receive a clamping bolt 157 that extends through the opening 77 in the rear end of the clamp member 71 and the slotted opening 156. The abutment sections 152 and 153 are apertured, as at 158, to receive a pin 159 which extends downwardly through the openings 158 and also through an opening 161 in the furrow opener frame abutment member 151. The pin 159 is removably disposed, as by having a cotter at its lower end, and a spring 162 is disposable between the abutment member 151 and either the upper or lower section 152 or 153. If, as shown in Figure 3, the spring 162 is disposed between the abutment member 151 and the lower abutment section 153, the spring 162 acts between the tool clamp unit 65 and the furrow opener unit 66 to prevent the latter from running too deep, the spring 162 tending to support at least a portion of the weight of the unit. This is the desired arrangement when the furrow openers 127 and 129 are operating in loose soil, such as the soil thrown up into a bed by the hilling disks 95, as shown in Figures 1 and 2.

The downward movement of the furrow opener unit 66 relative to the tool clamp unit 65 is limited by adjustable stop means that is effective in either position of the spring 162. The stop means just mentioned is indicated in its entirety by the reference numeral 170 and comprises a stud bolt 171 having its lower end threaded into a tapped opening 173 formed in the abutment stop 151 to one side of the opening 161 therein. A lock nut 174 is provided for holding the stud bolt 171 in different positions of adjustment. The lower end of the stud bolt extends downwardly relative to the abutment stop 151 and in a position to engage a stop bracket 175 that is welded to the rear end of the tool clamp or strap member 72. The stop means 170 just described also functions to raise the furrow opener unit 66 and associated parts when the tractor power lift is operated to raise the rig beams and the supporting bar 61 carried thereby. Preferably, the stop bracket 175 comprises an angle clip secured, as by welding, to the rear end of the member 72.

Figure 6:
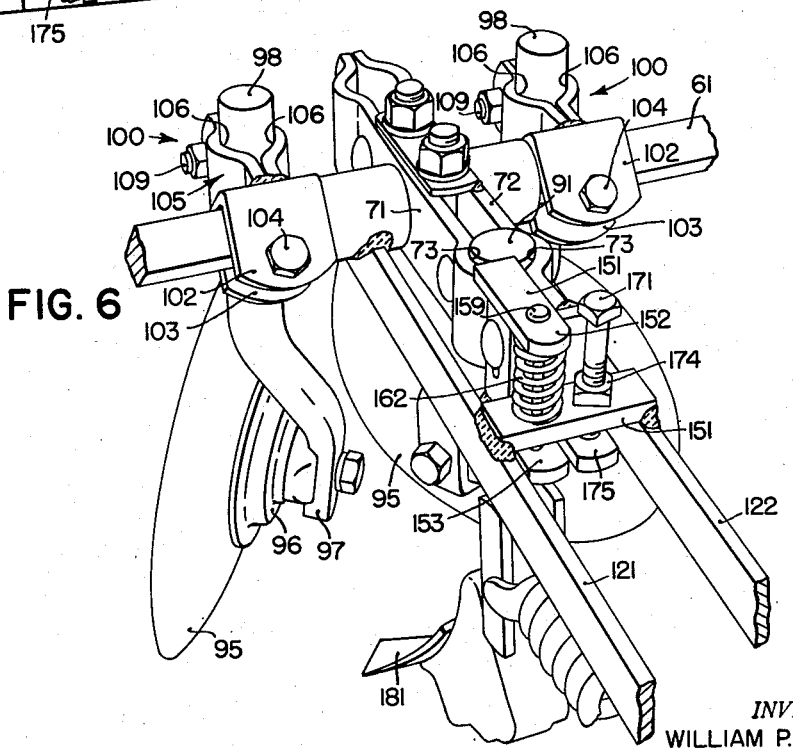
Figure 6 is a side view of the front portion of the planting and fertilizer attachment, showing the forward tools arranged to open the furrow, rather than throw up a bed as is done when the tools are arranged as shown in Figure 1.
Figure 7:
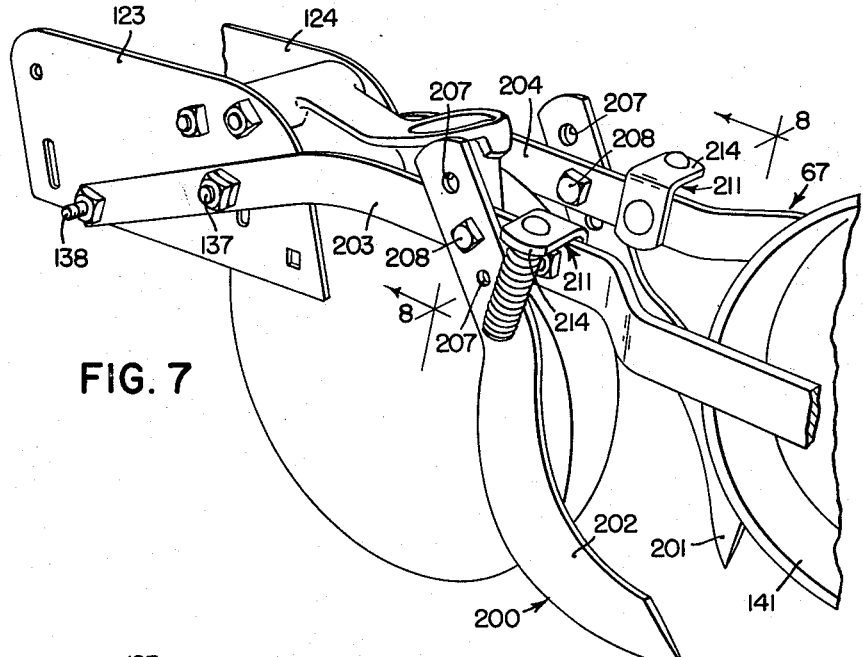
Figure 7 is a fragmentary perspective view of the new and improved mounting for the knife coverers of the planting and fertilizer attachment.

When it is desired to plant in a furrow, rather than on a bed or hill, the forward tools 90 and 95 are arranged as shown in Figure 6. The sweep 90 is replaced by a relatively narrow shovel 181 and the shank 91 disposed and clamped in the rear socket 73, 73 of the tool clamp member 65. Also, the disks 95 are disposed in a forward position in converging position, the disk shanks 98 being turned in the shank sockets 106, 106 after the clamping bolt 109 is loosened, and the pair of clamping units 100 removed by taking out the clamping bolts 104 associated with the U-shaped sections 101. Since the latter sections are open at their one side, the mere removal of the associated clamping bolts 104 permit the clamps to be removed from the supporting bar 61 without dismounting the latter. It is therefore a simple matter to remove the hilling disk units 95 from their rear position and interchange and dispose them forwardly of the supporting bar 61 for forming a furrow, for which purpose the hilling disks 95 in this position are disposed in forwardly converging relation. The function of the rearwardly disposed narrow shovel 181 is to tear out the small ridge of soil left between the lower portions of the disks 95 in their forward position and also to tear out any weeds or other growth on this ridge. When the tools are arranged in this manner, the soil in which the fertilizer and seed furrow openers 127 and 129 operate is somewhat harder than the soil of the ridge or bed thrown up by the disks 95 in their rear position, and under these conditions of operation it will probably be desirable to arrange the spring 162 about the abutment stop 151 so as to act against the upper abutment section 152 and the tool clamp unit 65 so as to exert a downward pressure against the furrow opener frame unit 66 so as to assure proper penetration of the furrow openers 127 and 129. This may readily be done by removing the pin 159, placing the spring 162 in its new position, and then replacing the pin 159, which thus serves to hold the spring 162 in proper position.

As best shown in Figures 1 and 2, the tractor carries a fertilizer can or hopper 180 and a seed can or hopper 181 at each side of the tractor, each hopper including dispensing mechanism which may be of the type shown in the United States Patent No. 2,375,850, issued to Theodore W. Johnson, May 15 1945, such dispensing mechanisms being driven by a chain 182 trained at its forward end over a sprocket for driving the aforesaid mechanisms and trained at its rear end over a sprocket carried by the driving axle at that side of the tractor. The fertilizer hopper discharges through a fertilizer tube 184 into the spout 128 of the fertilizer furrow opener 127, and the seed hopper discharges through a seed tube 186 into the seed spout 130 of the seed furrow opener 129. As best shown in Figure 2, the fertilizer furrow opener 127 is mounted on the furrow opener frame unit 66 at one side of the unit, which may be on the outer side, as shown in Figure 2, or the fertilizer furrow opener 127 may be mounted on the inner side of the frame unit 66, depending upon row spacing and other factors, especially the relation between the lateral position of the attachment relative to the tractor body, which, in some cases may call for the fertilizer tube 184 to extend downwardly at too great an angle if the fertilizer furrow opener 127 is to be placed on the laterally outer side of the unit 66, in which case the fertilizer furrow unit 127 is attached on the laterally inner side of the associated unit 66. In some cases the fertilizing mechanism may be dispensed with, but ordinarily fertilizer distributing apparatus is employed, with the fertilizer furrow opener unit 127 either on the outer side or the inner side of the associated furrow opener frame unit 66. The seed furrow opening unit 129 is ordinarily fixed in position substantially midway between the two bracket plates 123 and 124.

In order to assure proper filling of the fertilizer and seed furrows opened by the units 127 and 129 covering means, indicated in its entirety by the reference numeral 200, is provided. Preferably, the covering means 200, according to the principles of the present invention, includes a pair of knife covering members 201 and 202 pivotally mounted on the pair of bars 203 and 204, respectively, which comprise the press wheel frame of the unit 67. The forward ends of the press wheel frame bars 203 and 204 are apertured so as to be pivotally mounted on the attaching bolts 136, and the rear bolts 137 may be employed for fixing the bars 203 and 204 to the bracket plates 123 and 124 where it is desired to fix the unit 67 rigidly to the furrow opener unit 66. Each knife coverer member is provided at its upper end with a plurality of apertures 207 in any one of which a pivot bolt 208 may be disposed, the latter being carried by the associated press wheel frame bar. As best shown in Figure 1, where the attachment is provided with a fertilizer furrow opener unit 127 and the same is mounted, for example, on the laterally outer side of the frame unit 66, the laterally outer knife coverer member 201 is disposed on the laterally outer side of the press wheel frame bar 204. The laterally inner knife covering member 202 may be mounted on the laterally inner side of the associated press wheel frame bar 204 (see left hand portion of Figure 9), or both knife coverer members may be disposed on the laterally outer sides of the associated press wheel frame members 203 and 204.

Referring again to Figure 8, each of the knife coverer members 201 and 202 is urged downwardly by spring means which is indicated in its entirety by the reference numeral 210. Each spring means includes an angle bracket 211 having an attaching section 212 apertured to receive a fastening bolt 213. The other section 214 of the bracket 211 is apertured, at 215, to receive the headed end of a rod 217, the other end of which is formed as a hook section 218 and disposable in an opening 219 in the associated knife coverer member. A spring 221 is disposed about each rod 217 and at its upper end bears against the section 214 of the associated bracket 211 and at its lower end bears against the associated knife coverer member through contact with the hook portion at the lower end of the rod 217.

Figures 8, 9:
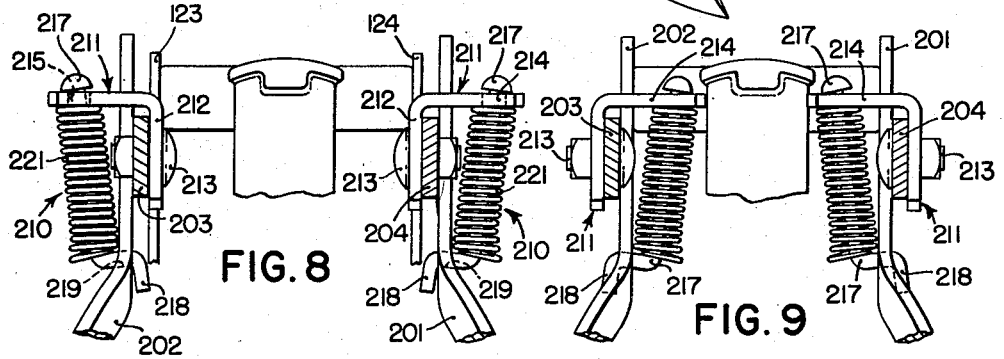
Figure 8 is a view taken generally along the line 8—8 of Figure 7.
Figure 9 is a view similar to Figure 8 but showing the knife coverer members in their optional or narrow setting.

As best shown in Figure 9, each knife coverer and associated spring means are arranged so that the knife coverer may be disposed optionally on either the inner or the outer side of the associated press wheel frame bar. For example, as illustrated, when the knife coverer member 201 is disposed on the outer side of the press wheel frame bar 204, the spring bracket 211 is fastened on the inside of the frame bar 204 and the spring receiving section 214 thereof extended laterally outwardly over the edge of the bar 204. If the knife coverer member is to be mounted on the inside of the associated press wheel frame bar, the spring bracket 211 is fastened on the outer side of the press wheel frame bar and the spring receiving section 214 thereof directed laterally inwardly so as to dispose the rod 217 and spring 221 in the proper position to act effectively against the knife coverer member. Where the fertilizer furrow opener is eliminated, it is preferable to have both knife coverers on the laterally inner sides of the associated press wheel frame bars, but when the fertilizer furrow openers are attached, either at one side or the other of the furrow opener frame, the knife coverer at that side of the attachment is preferably disposed at the outer side of the associated press wheel frame bar. The above described spring mounting and associated parts permit a ready change in the positions of the knife coverer members so that the coverer element at the side of the unit where the fertilizer furrow opener is disposed is placed in such position as to move a quantity of soil sufficient to cover adequately the fertilizer in the fertilizer furrow opener as well as at least a portion of the seed furrow, the other coverer member being preferably disposed on the laterally inner side of the associated press wheel frame bar so as to pull in just enough soil to complete the filling or covering of the seed furrow.

As described above, the planting and fertilizer attachments, constructed according to the principles of the present invention, are admirably adapted to be mounted on the cultivator rig beams of a two-row tractor mounted cultivator outfit, disposing the two planting and fertilizer attachments at opposite sides of the body of the tractor. Customarily, such two-row cultivator outfits are mounted on a tractor of the tricycle type. However, the planting and fertilizer attachment of the present invention is of comparatively small vertical dimension and is therefore admirably adapted to be mounted underneath the body of the one-row tractor of the four-wheel type for, having relatively small vertical dimension, the planting and fertilizer attachment unit may readily be raised and lowered into and out of transport position notwithstanding the disposition of the unit substantially directly underneath the body of a tractor.

Figure 10:
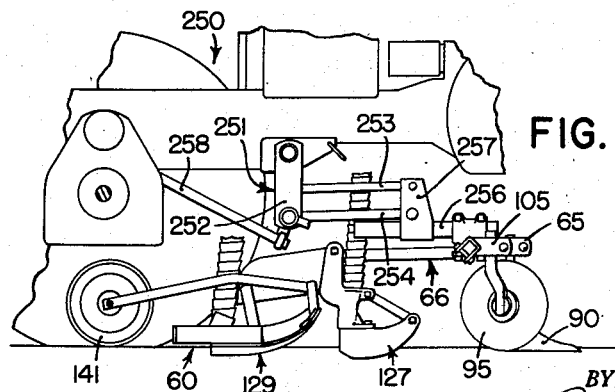
Figure 10 is a fragmentary view showing the planting and fertilizer attachment of the present invention as mounted on a farm tractor of the relatively low down four-wheel type.

Referring now to Figure 10, the four-wheel or one-row tractor is indicated in its entirety by the reference numeral 250 and on the underside thereof, and generally centrally laterally, carries an attaching unit 251 which includes a pair of downwardly depending laterally spaced brackets 252 to which the rear ends of two pairs of links 253, 254 are pivoted. The forward ends of each pair of links are pivoted to a cultivator rig beam 256 through a vertical bracket 257. The two rig beams 256 are disposed generally centrally underneath the body of the tractor and one of the planting and fertilizing attachments described above may readily be attached to the rig beams 256. Since these units require very little space, as compared with prior structures, the tractor power lift connection 258 which raises and lowers the rig beams 256 may be utilized for raising and lowering the associated unit 60 of the present invention out of and into working position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

In an agricultural implement, a support in the form of a crossbar, a relatively fixed elongated unit secured to said crossbar with the latter extending through a portion of said unit, a frame pivotally connected with said crossbar and including a pair of bars disposed on respective sides of said unit with each bar having a pivotal connection with said crossbar, a transverse abutment member fixed to said bars adjacent one end of said unit, a pair of vertically spaced arms fixed to and extending from said end of said unit generally in alignment with said unit, said abutment member lying between said arms and having an opening in vertical alignment with said arms, a vertical pin secured to said arms and extending through said opening, said pin being removable, and a spring disposed about said pin between said transverse abutment member and one of said arms.

WILLIAM P. OEHLER.

References Cited in the file of this patent

UNITED STATES PATENTS

| Number | Name | Date |
| --- | --- | --- |
| 719,823 | Lindgren | Feb. 3, 1903 |
| 790,576 | Jones | May 23, 1905 |
| 1,202,562 | Mintern | Oct. 24, 1916 |
| 1,838,535 | Dattisman | Dec. 29, 1931 |
| 1,863,970 | Donald | June 21, 1932 |
| 1,936,749 | Cady et al. | Nov. 28, 1933 |
| 2,230,331 | Mobley | Feb. 4, 1941 |
| 2,318,205 | Drennan | May 4, 1943 |
| 2,319,737 | Johnson | May 18, 1943 |
| 2,325,887 | Smith | Aug. 3, 1943 |
| 2,337,662 | Johnson | Dec. 28, 1943 |
| 2,351,078 | Silver | June 13, 1944 |
| 2,365,201 | McKahin | Dec. 19, 1944 |
| 2,375,850 | Johnson | May 15, 1945 |
| 2,376,559 | Smith | May 22, 1945 |
| 2,416,189 | McIntyre | Feb. 18, 1947 |
| 2,563,185 | Oehler et al. | Aug. 7, 1951 |

FOREIGN PATENTS

| Number | Country | Date |
| --- | --- | --- |
| 8,965 | Great Britain | 1912 |